(12) United States Patent
Wiesner

(10) Patent No.: US 9,981,304 B2
(45) Date of Patent: May 29, 2018

(54) METHOD FOR ASSEMBLING AN ENGINE MODULE

(71) Applicant: THYSSENKRUPP PRESTA TECCENTER AG, Eschen (LI)

(72) Inventor: Peter Wiesner, Mauren (LI)

(73) Assignee: THYSSENKRUPP PRESTA TECCENTER AG, Eschen (LI)

( * ) Notice: Subject to any disclaimer, the term of this patent is extended or adjusted under 35 U.S.C. 154(b) by 117 days.

(21) Appl. No.: 14/438,597

(22) PCT Filed: Oct. 25, 2013

(86) PCT No.: PCT/EP2013/072357
§ 371 (c)(1),
(2) Date: Apr. 24, 2015

(87) PCT Pub. No.: WO2014/067860
PCT Pub. Date: May 8, 2014

(65) Prior Publication Data
US 2015/0251238 A1  Sep. 10, 2015

(30) Foreign Application Priority Data

Oct. 29, 2012 (DE) .................. 10 2012 021 180
Jul. 10, 2013 (DE) .................. 10 2013 107 284

(51) Int. Cl.
*B21D 53/84* (2006.01)
*F16D 1/072* (2006.01)
(Continued)

(52) U.S. Cl.
CPC ......... *B21D 53/845* (2013.01); *B21D 26/033* (2013.01); *B21D 35/002* (2013.01);
(Continued)

(58) Field of Classification Search
CPC ..... B23P 11/005; B23P 11/02; B23P 2700/02; B23P 2700/07; B21D 53/845;
(Continued)

(56) References Cited

U.S. PATENT DOCUMENTS 4,781,076 A * 11/1988 Hartnett ............... B21D 53/845
29/432
7,325,305 B2 * 2/2008 Vogel ................... B21D 53/845
29/433

(Continued)

FOREIGN PATENT DOCUMENTS

CN    103080485 A    5/2013
DE    19821807 A1   12/1999
(Continued)

OTHER PUBLICATIONS

Machine translation for H08-294832 A.*
(Continued)

*Primary Examiner* — Christopher Besler
(74) *Attorney, Agent, or Firm* — thyssenkrupp North America, Inc.

(57) ABSTRACT

Disclosed herein is a method for assembling a module for a motor vehicle engine, which module comprises at least one supporting structure with bearing seats and at least one camshaft which is mounted rotatably in the bearing seats, the camshaft being constructed during the assembly of the module from a support shaft which is configured at least in sections as a hollow shaft and components which are to be connected to the support shaft at predefined joining positions. The method includes providing a supporting structure having bearing seats, positioning components to be affixed to a support shaft in a preliminary position with respect to the bearing seats, pushing the support shaft through the bearing seats and through-openings of the components, enlarging portions of the outer diameter of the support shaft (Continued)

at defined joining positions thereof, and axially moving the components on the support shaft onto the joining positions.

20 Claims, 4 Drawing Sheets

(51) Int. Cl.
| | |
|---|---|
| F16H 53/02 | (2006.01) |
| F01L 1/053 | (2006.01) |
| B21D 26/033 | (2011.01) |
| B21D 35/00 | (2006.01) |
| B21D 39/00 | (2006.01) |
| B23P 11/00 | (2006.01) |
| F01L 1/047 | (2006.01) |

(52) U.S. Cl.
CPC .............. *B21D 39/00* (2013.01); *B23P 11/00* (2013.01); *F01L 1/047* (2013.01); *F01L 1/053* (2013.01); *F16D 1/072* (2013.01); *F16H 53/025* (2013.01); *B23P 11/005* (2013.01); *B23P 2700/02* (2013.01); *F01L 2001/0471* (2013.01); *F01L 2001/0475* (2013.01); *F01L 2001/0476* (2013.01); *Y10T 29/49293* (2015.01)

(58) Field of Classification Search
CPC .... B21D 26/033; B21D 35/002; B21D 39/00; F16H 53/025
See application file for complete search history.

(56) References Cited

U.S. PATENT DOCUMENTS

| | | | | |
|---|---|---|---|---|
| 2002/0096014 | A1* | 7/2002 | Leuthold | ................ F16D 1/072 |
| | | | | 74/567 |
| 2008/0283018 | A1* | 11/2008 | Sakurai | ................ B21D 53/845 |
| | | | | 123/195 R |
| 2012/0103130 | A1* | 5/2012 | Bechtold | ................ B23P 15/00 |
| | | | | 74/567 |
| 2013/0283613 | A1 | 10/2013 | Walter | |

FOREIGN PATENT DOCUMENTS

| | | | |
|---|---|---|---|
| DE | 10134840 A1 | 1/2003 | |
| DE | 2011-001230 A1 * | 10/2011 | .............. B23P 13/00 |
| EP | 1155770 B1 | 8/2004 | |
| EP | 1936131 A | 6/2008 | |
| GB | 2290599 A | 1/1996 | |
| JP | 08-294832 A | 11/1996 | |
| JP | 2008163833 A | 7/2008 | |
| WO | 2012031770 A | 3/2012 | |

OTHER PUBLICATIONS

English Translation of Abstract of EP1155770 (B1).
English Translation of Abstract of DE 10134840 (A1).
English Translation of Abstract of DE 19821807 (A1).
English abstract for JP2008163833A.
Japanese Office Action issued in JP 2015-538455, dated Dec. 12, 2017 [[English translation attached]].

* cited by examiner

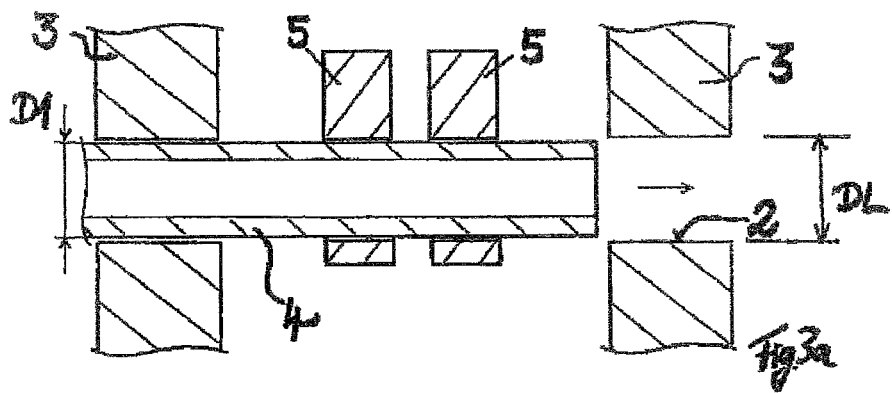
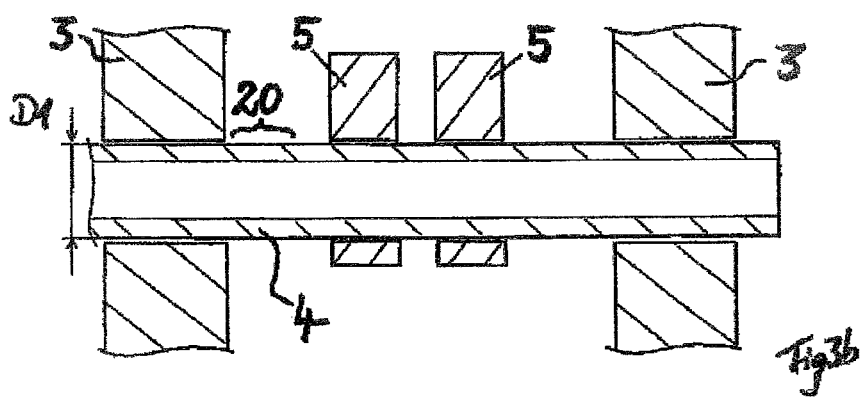
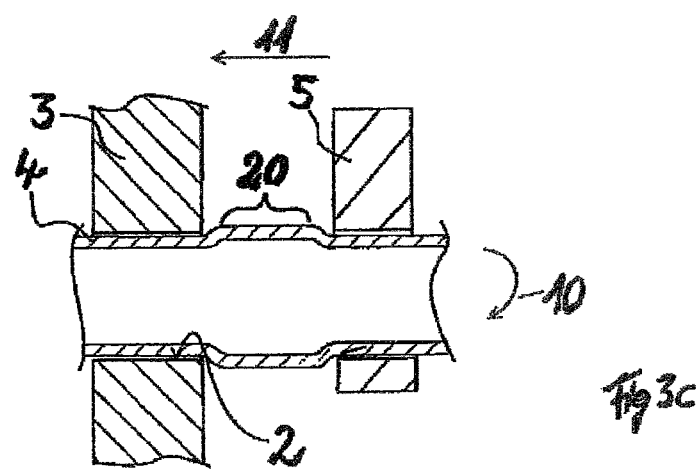

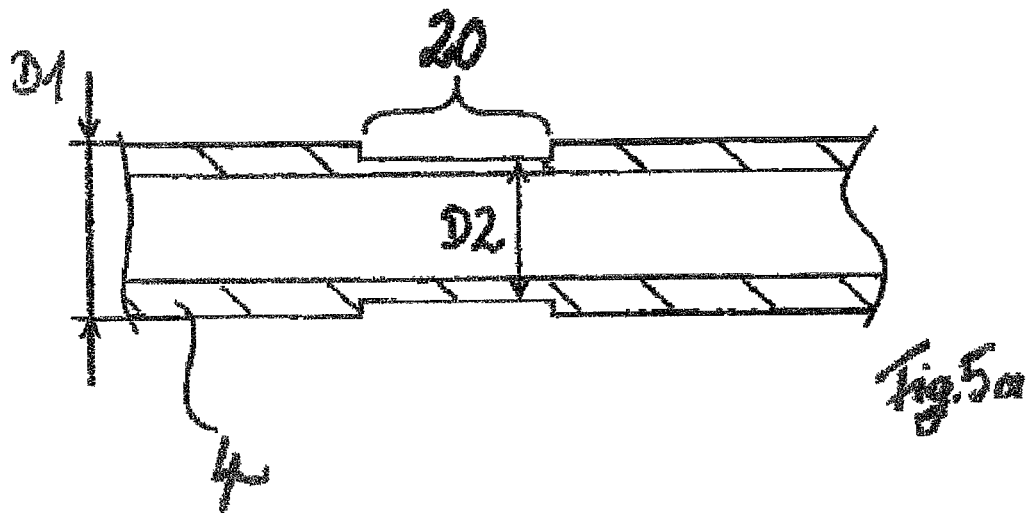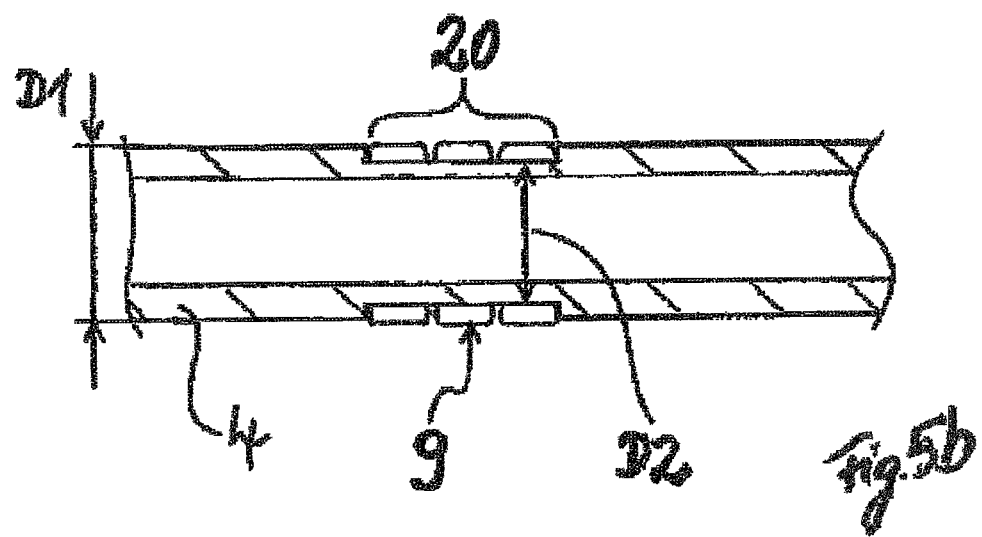

METHOD FOR ASSEMBLING AN ENGINE MODULE

CROSS REFERENCE TO RELATED APPLICATIONS

This application is a U.S. National Stage Entry of International Patent Application Serial Number PCT/EP2013/072357, filed Oct. 25, 2013, which claims priority to German patent application nos. DE 102013107284.4 filed Jul. 10, 2013 and DE 102012021180.5 filed Oct. 29, 2012, the entire contents of each of which are incorporated herein by reference.

FIELD

The invention relates to a method for assembling a module for a motor vehicle engine, which module comprises at least one supporting structure with bearing seats and at least one camshaft which is mounted rotatably in the bearing seats, the camshaft being constructed during the assembly of the module from a support shaft and components which are to be connected to the support shaft, and the components having through openings for receiving the support shaft.

BACKGROUND

In order to reduce the mounting complexity during the assembly of a motor vehicle engine and to reduce logistics and storage costs during engine assembly, modules which are already finally assembled are supplied to the assembly line of the car manufacturers by the suppliers. Modules of this type consist, for example, of a cylinder head cover and a camshaft which is mounted therein. During the assembly of the engine, this module can be handled more simply than the individual constituent parts and can be mounted on the cylinder head of the engine.

EP 1155770 B1 has disclosed an assembly method for a module which comprises a cylinder head cover and a camshaft which is mounted therein. In the assembly method which is described, a cylinder head cover is provided with leadthroughs which are penetrated by the shaft, the subsequent camshaft. The components to be fastened on the shaft, such as cams, have to be arranged in specific seats in such a way that they are situated precisely in the required angular orientation and the required axial position, in accordance with their arrangement on the finally constructed camshaft. After the components and the cylinder head cover are oriented with respect to one another, the support shaft is pushed through the leadthroughs. The cams are fastened on the shaft by means of a press joint. In order to produce this press joint, various possibilities are specified in EP 1155770 B1. According to one of these possibilities, the press joint is produced by the shaft being pressed into the cams under the exertion of force.

It is a disadvantage of this method that the cams are pushed over the entire shaft and in the process damage the surface of the shaft with scratches and/or score marks. Damage of this type is very disadvantageous precisely in the region of the bearing points.

Another possibility disclosed in EP 1155770 B1 for producing the press joint consists in the shaft being widened in the region of the components by means of internal high pressure reshaping processes and the components being fastened in the process by means of a shrink fit. One disadvantage of this fastening process consists in no information being available about the press fit which is produced and therefore about the fastening of the cams on the shaft, by way of which information the quality of the connection between the cam and the shaft can be assessed. Reliable series production is therefore possible only with difficulty. An insufficient press fit or a damaged cam therefore initially remains unnoticed.

Moreover, the method which is known from EP 1155770 B1 is complicated and associated with high costs, since the components to be fastened on the shaft already have to be positioned and oriented before being pushed onto the shaft in precisely the same way as they are to be arranged on the subsequent camshaft. In order to achieve this, specific holding elements are required, into which the components can be inserted and can be held therein in an angularly and positionally correct manner. The production of these holding elements is complicated and expensive. Moreover, different holding elements are required for different camshafts, since the angular orientation of the cams is, for example, dependent on the engine (for example, 2-cylinder or 4-cylinder), as a result of which this method is very in-flexible.

SUMMARY

The invention is based on the object of specifying a method for assembling a module which comprises a supporting structure and a camshaft, in which method no specifically configured apparatuses are required for holding and arranging the components to be fastened on the support shaft in the respectively correct angular position, and which method can be used flexibly for different camshafts for different engines.

In one aspect of the present disclosure, a method as disclosed herein includes providing a supporting structure with bearing seats, positioning of components to be fastened on a support shaft in a predefined sequence in such a way that the components are arranged with their through openings aligned with respect to the bearing seats of the supporting structure, and pushing the support shaft through the bearing seats of the supporting structure and the through openings of the components.

BRIEF DESCRIPTION OF THE DRAWINGS

The present disclosure is described in detail below with reference to the attached drawing figures, wherein:

FIG. 3a is a side cross section view showing an embodiment of a method step of the present disclosure, in which a support shaft is pushed through bearing seats of a supporting structure and through-openings of components to be fastened on the support shaft.

FIG. 3b is a side cross section view showing an embodiment of components that form a module, after the support shaft has been pushed through.

FIG. 3c is a side cross section view showing the support shaft having a widened diameter portion and the component that is assigned to it.

FIG. 5a a side cross section view of an embodiment of a support shaft of the present disclosure.

FIG. 5b a side cross section view of an embodiment of a support shaft before undergoing the joining process, as disclosed herein.

DETAILED DESCRIPTION

Figure 1:
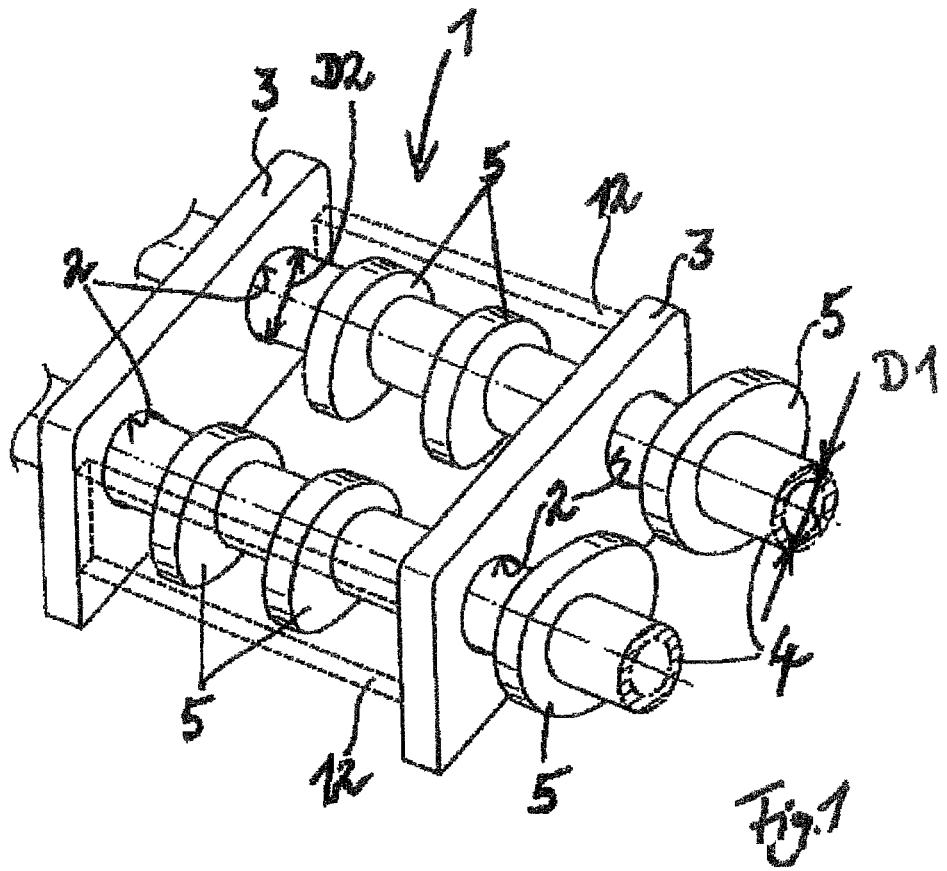
FIG. 1 is a isometric view of an embodiment of a module of the present disclosure.

One advantage of the method according to the invention consists in the components to be fastened on the support shaft, such as cams, sensor wheels, etc., being merely pre-positioned before the support shaft is pushed in. That is to say, they are arranged at those axial positions of the support shaft which do not correspond to the axial positions which these components assume on the finally constructed camshaft. The components therefore do not yet need to be oriented precisely with regard to their angular position relative to the support shaft. In the method according to the invention, precise orientation of the components before the support shaft is pushed in can therefore be dispensed with completely, for which reason the requirements of the holding apparatuses of the components are considerably lower.

In the method according to the invention, after the support shaft is pushed into the bearing seats of the supporting structure and the through openings of the components, the diameter of the support shaft is enlarged by widening. That diameter of the support shaft which is produced by way of the widening, and the diameter of the through openings of the components, define the overlap between the support shaft and the components and therefore determine the torque which can be transmitted by the components after they have been pushed onto the respective joining position. At the time of the diameter widening of the support shaft, the components are still pre-positioned and are not in their provided joining position.

For the configuration of the diameter widening, the support shaft which is configured at least partially as a hollow shaft is subjected to internal pressure reshaping, the support shaft being deformed elastically and plastically at least partially at the joining positions and the diameter widening thus being produced. The internal pressure reshaping takes place, for example, by means of a fluid which is introduced into the cavity of the support shaft and is pressurized.

However, the increase in diameter can also be realized by means of a pressure element, such as a mandrel or the like, being spread open in the support shaft. The spreading open of the mandrel can take place mechanically or hydraulically. The diameter widening operations of the support shaft can be configured one after another or at the same time. The prior art has already described a multiplicity of apparatuses and methods for internal pressure reshaping (for example, DE 10134840 A1, DE 19821807 C2), with the result that a further explanation of the possible apparatuses and methods is dispensed with here.

The advantage of producing the increase in diameter by means of internal pressure reshaping lies in the low space requirement radially around the support shaft. Merely the access to the corresponding cavity in the support shaft is required. As a rule, the cavity is open towards the end side of the camshaft and the fluid or the pressure medium can thus be introduced simply into the cavity. In the case of internal pressure reshaping by means of a spreadable mandrel or the like, sealing against the escape of fluid can additionally be dispensed with, which further reduces the costs. It can be advantageous to radially support or guide the support shaft during the internal pressure reshaping at least in the region of the increase in diameter. The configuration of the increase in diameter can thus be controlled in an improved manner and the concentricity of the increase in diameter with respect to the support shaft and with respect to the bearing seats can be ensured.

In the method according to the invention, the components can be displaced axially along the support shaft and can be pressed onto the increase in diameter of the support shaft which is assigned to them in each case. However, it is also possible to displace the support shaft axially and to press the portions of increased diameter which are allocated to the respective components into the through openings of the components.

The respective angular position of each individual component relative to the support shaft can be set in a simple way by virtue of the fact that the support shaft is rotated relative to the respective component by a defined angle, with the result that the required relative angular position of the component with respect to the support shaft is reached. Different modules with quite different camshafts for different engines can therefore be constructed by way of the method according to the invention, without a specific holding apparatus being required in each case for each different camshaft, in order to ensure the positioning and orientation of the cams on the support shaft. Modules with different camshafts can therefore be produced in an inexpensive and simple way for different engines or engine variants by way of the method according to the invention and by way of one and the same assembly apparatus, in which modules the components to be fastened on the camshaft are arranged in different angular positions relative to the support shaft.

The supporting structure is, for example, a bearing block, a bearing frame or a cylinder head cover with bearing seats for one or more camshafts. The connection of the bearing blocks among one another can take place in a non-positive, positively locking and/or integrally joined manner. The position at which the bearing seats are connected to one another is usually fixed depending on the cylinder head and/or the components which are arranged in the cylinder head. The bearing seats of the supporting structure and the diameter of the support shaft can be dimensioned in such a way that the bearing seats of the supporting structure form a plain bearing together with the camshaft in the finally assembled state of the module. For this purpose, the support shaft can be configured in such a way that it already has the diameter which is required for the configuration of a plain bearing before or only after material-removing-machining, such as grinding or turning. In particular, grinding and/or turning processes are advantageous in order to increase the surface quality or to reduce the roughness in the region of the support shaft regions which are provided for the plain bearing.

In one refinement of the method according to the invention, before the support shaft is pushed through the bearing seats of the supporting structure and the through openings of the components, at least one structure which is arranged at least partially on the joining position of the components is configured on the circumferential face of the support shaft. One advantage of this variant of the method according to the invention is that the structure is situated at least partially in the region of the diameter widening and the structure can be utilized for the configuration of the overlap between the support shaft and the leadthrough opening of the components. As a result, the fixing of the components can be influenced and adapted simply and individually. Thus, for example, the overlap between the component and the support shaft can be adapted individually to the component and impermissible elongation of the component and therefore its damage can be avoided during fastening on the support shaft.

In a further preferred embodiment of the method according to the invention, the structure is produced by means of plastic reshaping of the shell of the support shaft. Plastic reshaping processes are, for example, material-displacing processes, such as roll-forming, knurling, kneading or compressing.

According to a further refinement of the method according to the invention, the structure which is configured on the circumferential face of the support shaft can be produced by means of a material-removing process with a geometrically defined or geometrically undefined cutting edge. Material-removing processes with a geometrically defined cutting edge are, for example, turning or milling. Typical processes for material-removing processes with a geometrically undefined cutting edge are, for example, grinding and honing.

In a further exemplary embodiment, the structure is configured, for example, by means of thermal or chemical removal, such as laser or electron beam machining, erosion or etching.

Splines are advantageously configured in the leadthrough openings of the components, which splines can dig into the structure when the components are pushed onto the increase in diameter. In this way, a positively locking connection between the support shaft and the components is also configured in addition to the non-positive connection.

In order to produce the structure, various processes are applied in combination with one another in one development of the method according to the invention. Thus, for example, the roll-formed portion can be reground in a following method step and the diameter of the roll-formed region can thus be brought to a predefined size.

In the abovementioned refinements of the invention, at least some of the components and/or the supporting structure can be heated before and/or while the support shaft is pushed through the openings of the supporting structure or of the components, as a result of which the diameter of the through openings and/or the diameter of the bearing seats are/is enlarged and pushing through of the support shaft and therefore the assembly are considerably simplified.

An advantage of the described method is, furthermore, that the pressing of the components onto the diameter widening or the structure is monitored by way of a force sensor and can be documented in a force-displacement diagram. Each press connection can therefore be monitored during the assembly of the module and the quality of the connections between the components and the support shaft can be documented. Series-suitable manufacturing quality can be ensured in this way. Connections with an insufficient strength or connection quality can be detected via the force-displacement diagram. Camshafts with faults of this type can be rejected, with the result that they are not shipped.

Various embodiments and aspects of the present disclosure is described in greater detail below with reference to the attached drawing figures.

FIG. 1 shows a module 1 for a motor vehicle engine, comprising a supporting structure 3 with bearing seats 2 and camshafts which are constructed and mounted rotatably in the bearing seats 2. The constructed camshafts comprise a support shaft 4 which is configured as a hollow shaft with components 5 fastened thereon. The supporting structure 3 is, for example, a bearing block for mounting one or more camshafts. If there are a plurality of bearing blocks, they can be connected to one another, for example, as shown in FIG. 1 using a connecting element 12 which is shown using dashed lines. The connecting element 12 can be configured in one piece with the bearing blocks or as a separate component. If the connecting element 12 is a separate component, it can be connected to the bearing blocks in a positively locking, non-positive and/or integrally joined manner. A bearing frame is then produced. One possible configuration of the bearing frame is a cylinder head cover, that is to say the bearing frame and the cylinder head cover form one structural unit. The supporting structure 3 or the bearing frame can be fastened on a cylinder head of a motor vehicle engine (not shown).

Figure 2:
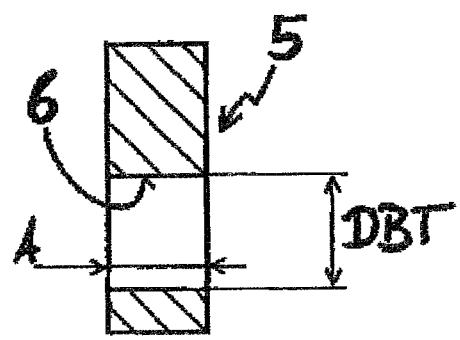
FIG. 2 is a side cross section view of an embodiment of a component to be fastened on a support shaft, as disclosed herein.

The support shaft 4 has a diameter D1 and forms a plain bearing with the bearing seats 2 of the supporting structure 3 in the assembled state of the module. The bearing seats 2 have a diameter DL. In order, for the sliding bearing, to increase the surface quality of the support shaft 4 and/or to obtain a predefined diameter D1 of the support shaft 4, the support shaft 4 can be machined, preferably starting from a larger diameter. Preferred machining processes are, for example, grinding, honing or turning. The components 5 which are fastened on the support shaft are, for example, cams, sensor wheels and the like. The figures show the fastening of cams by way of example, it being possible for other components to be fastened in the same way. The component 5 has a through opening 6 with the diameter DBT and a width A in the region of the through opening 6, as shown in FIG. 2. The through opening 6 of the component is greater than or equal to the diameter D1 of the support shaft 4, with the result that the component 5 can be threaded onto the support shaft 4 or can be pushed over the latter, cf. FIG. 3. In order that the support shaft 4 can configure a plain bearing with the bearing seats 2, the diameter of the support shaft 4 and the diameter of the bearing seat 2 have to be adapted to one another.

In the method according to the invention, the supporting structure 3 and the components 5 are positioned in such a way that the components 5 are arranged between the bearing seats 2 in a predefined sequence and the through openings 6 of the components are aligned among one another and with the bearing seats 2 of the supporting structure 3. The angular orientation of the components 5 among one another and their respective angular orientation relative to the support shaft 4 do not yet have to be taken into consideration here. The components are preferably oriented in such a way that they are received reliably in the holding apparatus as a result of their weight. The sequence, in which the components 5 are arranged among one another, corresponds to the sequence of the components 5 on the finished camshaft. The axial position of the components 5 does not correspond to the axial positions or the joining positions 20 which the components 5 assume on the finally constructed camshaft. The cams are therefore pre-positioned in a defined axial position. The support shaft 4 is oriented so as to be aligned with the bearing openings 2 of the supporting structure 3 and the through openings 6 of the components 5 and is pushed through (cf. FIG. 3a).

When the support shaft 4 is pushed through the bearing seats 2 of the supporting structure 3 and the through openings 6 of the components 5, the support shaft 4 can be guided (not shown) by a lance which acts on the end side. In order to facilitate pushing through of the support shaft 4, the support shaft 4 can be cooled and/or the supporting structure 3 and/or at least some of the components 5 can be heated. As a result of the cooling of the support shaft 4, its diameter is reduced, whereas the heating of the components 5 or the supporting structure 3 increases the diameter DBT of the through opening 6 or the diameter DL of the bearing openings 2. After the support shaft 4 is pushed through, temperature equalization takes place. The components 5 are now pre-positioned on the support shaft 4, but are not yet fixed in their joining position 20 (FIG. 3b).

FIG. 3c shows the result of the following method step of the diameter widening in the region of the joining position 20. As shown in FIG. 3c, the diameter D1 of the support shaft 4 is increased at least partially in the axial joining position 20 of the support shaft 4, in which joining position 20 a component 5 is to be fixed. The required size of the increase in diameter 7 is also determined by the torque which is to be transmitted by the finally assembled component 5, since the torque which can be transmitted by the components 5 is also dependent on the overlap between the increase in diameter 7 and the through opening 6 of the component 5.

Before the component 5 is pressed or pushed onto the increase in diameter 7 or the increase in diameter 7 which is allocated to the components is pressed into the through openings 6 of the components 5, the desired angular position of the component 5 relative to the support shaft 4 is set by way of rotation of the support shaft 4. This is indicated in FIG. 3c by the arrow 10. The arrow 11 shows the subsequent pressing-on direction for the component 5. The pressing-on for the further components 5 takes place in an analogous manner. The desired angular position of the component 5 relative to the support shaft 4 is also set here in a very simple way again by way of simple rotation of the support shaft 4, before the respective component 5 is pushed onto the increase in diameter 7.

Figure 3D:
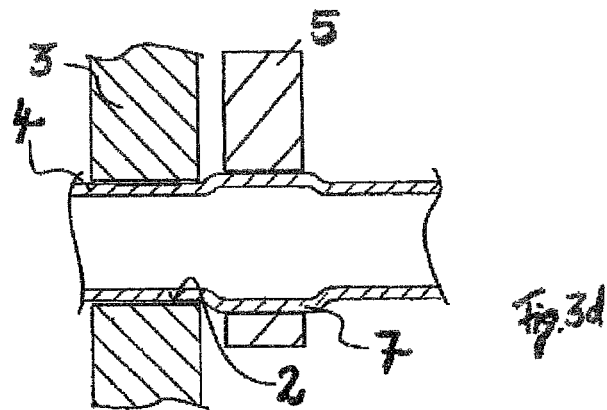
FIG. 3d is a side cross section view showing an embodiment of a joined component of the present disclosure.

FIG. 3d shows a component 5 which has been pushed or pressed onto the increase in diameter 7 of the support shaft 4.

Figure 3E:
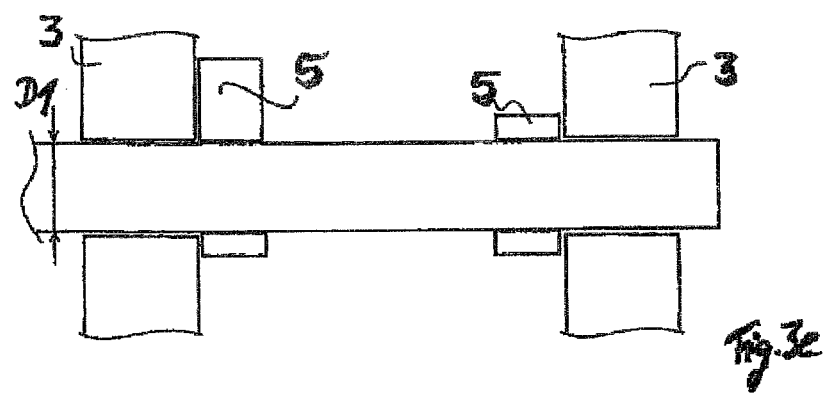
FIG. 3e is a side cross section view showing an embodiment of two components that are fixed on a support shaft, as disclosed herein.

FIG. 3e diagrammatically shows two components 5 which are fixed on the support shaft 4 in the respectively predetermined angular position, in which they are situated differently to one another. For reasons of clarity, the widened diameter portions at the joining positions of the components 5 are not shown in FIG. 3e.

Figure 4:
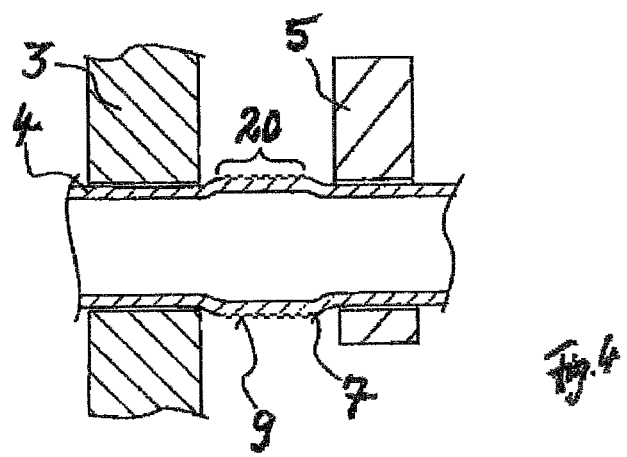
FIG. 4 is a side cross section view showing a development of the joining process as disclosed herein.

In one development of the method according to the invention, a structure 9 which is arranged at least partially in the joining region 20 is configured (FIG. 4). After the configuration of the increase in diameter 7, this structure 9 contributes to the overlap between the increase in diameter 7 and the through opening 6 of the components 5 or forms this overlap.

The structure can be produced by way of plastic and material-displacing processes, such as kneading, roll-forming or knurling. In the exemplary embodiment which is shown, the structure 9 has been produced by way of roll-forming.

However, it is also possible that the structure is configured by means of a material-removing process with a geometrically defined or geometrically undefined cutting edge. For example, turning is preferred as a process with a geometrically defined cutting edge and, for example, grinding is preferred as a process with a geometrically undefined cutting edge.

Furthermore, however, material-removing processes are also possible, such as erosion, laser or electron beam machining.

Since the support shaft 4 is to configure a plain bearing with the bearing seat 2, it is required that the support shaft 4 or the diameter of the support shaft 4 which is produced on or by way of the structure 9 is dimensioned in such a way that the support shaft 4 or the structure 9 can be pushed through the bearing seats 2 of the supporting structure 3 and the through opening 6 of the components 5. The external diameter of the support shaft 4 in the region of the structure 9 is therefore influenced or stipulated by the diameter of the bearing seat 2. In order to obtain the required diameter conditions, the structure 9 can be machined before the support shaft 4 is pushed into the bearing seat 2, and the corresponding diameter can be set. Subsequent machining of this type can take place, for example, by way of grinding or turning.

However, it is also conceivable that the diameter of the support shaft 4 in the region, in which the structure 9 is configured, has a diameter D2 which is smaller than the diameter D1 of the support shaft 4 in the region of the plain bearing, as shown in FIG. 5a. The structure 9 which is configured with the diameter D2 in the region can thus contribute a greater proportion to the overall diameter D1 of the support shaft 4, without the diameter D1 being changed. After the widening of the support shaft 4, a structure of this type can make a greater positively locking connection to the component 5 and therefore a higher transmittable torque possible, since the component 5 can displace material in an improved manner and to a greater extent when being pushed onto the structure 9 or onto the increase in diameter 7. In particular, material-adding processes, such as welding and the application of solder, can also be utilized here to configure the structure 9. However, the support shaft 4 also has to be capable of being pushed through the bearing seats 2 and the through openings 6 in this refinement. In order to achieve this, the structure 9 can also be subsequently machined in this refinement. FIG. 5b thus shows a support shaft 4, in which the region 20 has been ground to the diameter D1 after the configuration of the structure 9.

The through opening 6 of the components 5 is advantageously provided with projections which reduce the diameter of the through opening 6, such as splines (not shown in the figures). These projections are advantageously distributed uniformly over the circumference of the through opening 6 and in addition have a greater hardness than the support shaft 4 or the structure 9. The splines of the components 5 can then dig into the increase in diameter 7 or the structure 9 and produce a combination of a non-positive and positively locking connection. The torque which can be transmitted by the components 5 is increased by way of the non-positive and positively locking connection.

Furthermore, it has proven advantageous to coat the support shaft 4 at least in a part region of the joining position 20 with a coating which increases the frictional moment, such as zinc.

The invention claimed is:
1. A method for assembling a module for a motor vehicle engine, the module having at least one supporting structure with bearing seats and at least one camshaft which is mounted rotatably in the bearing seats, the camshaft being constructed during the assembly of the module from a support shaft having a cavity defined therein, which support shaft is configured at least in sections as a hollow shaft and components that are to be connected to the support shaft at predefined joining positions, the cavity of the support shaft extending at least partially under the joining positions, and the components having through openings defined therein for receiving the support shaft, the method comprising:
   providing the supporting structure having bearing seats defined therein;
   positioning one or more components that are to be fastened on the support shaft at preliminary axial positions in a predefined sequence such that the through openings of the components are aligned with the bearing seats of the supporting structure;

pushing the support shaft through the bearing seats of the supporting structure and the through openings of the one or more components that are to be fastened thereto;

after said pushing step, enlarging, by an internal pressure reshaping method, the outer diameter of the support shaft at least at one or more joining positions of the support shaft, which for each respective component the respective joining position is disposed at a different axial location along the support shaft than the respective preliminary position for such component, said enlarging step resulting in an outer diameter of the support shaft at one or more of said joining positions that is larger than the corresponding inner diameters of the through openings of the respective components to be finally affixed at each joining position, such that there is a pre-definable amount of overlap between the outer diameter of the support shaft at one or more joining positions and the corresponding inner diameter of the component to be seated at such joining position, which overlap is sufficient to create an interference fit there between;

after said enlarging step, fastening each of the one or more components to the support shaft one or more at a time, in each instance said fastening step comprising:
while in its respective preliminary position, setting the desired rotational angular position of the component relative to the support shaft by rotating the support shaft by a defined angle relative to the component, and
after said setting step, seating the component to its corresponding joining position on the support shaft by at least one of axially displacing the component along the support shaft from its respective preliminary position to its joining position on the support shaft, or axially displacing the support shaft relative to the component so as to move the preliminary position of the support shaft out of engagement with the through opening of the component and thereby move the joining position of the support shaft into engagement with the through opening of the component.

2. The method of claim 1, wherein said step of enlarging, by an internal pressure reshaping method, includes generating internal pressure within a cavity of the support shaft, by a pressurized fluid.

3. The method of claim 1, wherein during said step of enlarging, by an internal pressure reshaping method, a pressure in a cavity of the support shaft is generated by spreading a pressure element within a cavity defined in the support shaft.

4. The method of claim 1, further comprising:
prior to said step of pushing the support shaft through the bearing seats of the supporting structure and the through openings of the components, arranging at least one structure on a circumferential face of the support shaft that extends at least partially into the region of the joining positions of the components.

5. The method of claim 4, wherein said step of arranging at least one structure on the circumferential face of the support shaft comprises plastic reshaping of the circumferential face of the support shaft to produce the at least one structure thereon.

6. The method of claim 5, wherein the plastic reshaping is a material-displacing process.

7. The method of claim 4, wherein said step of arranging at least one structure on the circumferential face of the support shaft comprises subjecting the circumferential face to a material-removing process having at least one of a geometrically defined or geometrically undefined cutting edge to produce the at least one structure thereon.

8. The method of claim 7, wherein said step of arranging at least one structure on the circumferential face of the support shaft is performed by subjecting the circumferential face of the support shaft to a material-removal grinding process using a geometrically undefined cutting edge.

9. The method of claim 7, wherein said step of arranging at least one structure on the circumferential face of the support shaft is performed by subjecting the circumferential face of the support shaft to a material-removal turning process using a geometrically defined cutting edge.

10. The method of claim 4, wherein said step of arranging at least one structure on the circumferential face of the support shaft is performed by one of an erosion, laser, or electron beam material-removal process.

11. The method of claim 4, wherein said step of arranging at least one structure on the circumferential face of the support shaft is performed by one of a welding or brazing material-addition process.

12. The method of claim 4, further comprising machining the at least one structure prior to said step of pushing the support shaft through the bearing seats.

13. The method of claim 4, further comprising heating one or more of the supporting structure and components prior to said step of pushing the support shaft through the bearing seats of the supporting structure and the through openings of the components.

14. The method of claim 4, further comprising heating one or more of the supporting structure and components during said step of pushing the support shaft through the bearing seats of the supporting structure and the through openings of the components.

15. The method of claim 1, wherein at least a portion of a region of the joining position on the support shaft has a coating disposed thereon that increases a frictional moment.

16. A method for assembling a module for a motor vehicle engine, the module having at least one supporting structure with bearing seats and at least one camshaft which is mounted rotatably in the bearing seats, the camshaft being constructed during the assembly of the module from a support shaft having a cavity defined therein, which support shaft is configured at least in sections as a hollow shaft and components that are to be connected to the support shaft at predefined joining positions, the cavity of the support shaft extending at least partially under the joining positions, and the components having through openings defined therein for receiving the support shaft, the method comprising:
providing the supporting structure having bearing seats defined therein;
positioning one or more components that are to be fastened on the support shaft at preliminary axial positions in a predefined sequence such that the through openings of the components are aligned with the bearing seats of the supporting structure;
pushing the support shaft through the bearing seats of the supporting structure and the through openings of the one or more components that are to be fastened thereto;
after said pushing step and without regard to the axial rotational angular positions of each of the one or more components with respect to each other or the support shaft, enlarging, by an internal pressure reshaping method, the outer diameter of the support shaft at least at one or more joining positions of the support shaft, which for each respective component the respective joining position is disposed at a different axial location along the support shaft than the respective preliminary position for such component, said enlarging step resulting in:

an outer diameter of the support shaft at one or more of the preliminary positions remaining smaller than the corresponding inner diameters of the through openings of the respective one or more components disposed at such positions, such that each of the one or more components disposed at the preliminary positions remain axially rotatable about the support shaft, and an outer diameter of the support shaft at one or more of said joining positions that is larger than the corresponding inner diameters of the through openings of the respective components to be finally affixed at each joining position, such that there is a pre-definable amount of overlap between the outer diameter of the support shaft at one or more joining positions and the corresponding inner diameter of the component to be seated at such joining position, which overlap is sufficient to create an interference fit therebetween; and after said enlarging step, fastening each of the one or more components to the support shaft one or more at a time, in each instance said fastening step comprising:

while in its respective preliminary position, setting the desired rotational angular position of the component relative to the support shaft by rotating the support shaft by a defined angle relative to the component, and after said setting step, seating the component to its corresponding joining position on the support shaft by at least one of axially displacing the component along the support shaft from its respective preliminary position to its joining position on the support shaft, or axially displacing the support shaft relative to the component so as to move the preliminary position of the support shaft out of engagement with the through opening of the component and thereby move the joining position of the support shaft into engagement with the through opening of the component.

17. The method of claim 16, wherein said step of enlarging, by an internal pressure reshaping method, includes generating internal pressure within a cavity of the support shaft, by a pressurized fluid.

18. The method of claim 16, wherein during said step of enlarging, by an internal pressure reshaping method, a pressure in a cavity of the support shaft is generated by spreading a pressure element within a cavity defined in the support shaft.

19. The method of claim 16, further comprising: prior to said step of pushing the support shaft through the bearing seats of the supporting structure and the through openings of the components, arranging at least one structure on a circumferential face of the support shaft that extends at least partially into the region of the joining positions of the components.

20. The method of claim 19, wherein said step of arranging at least one structure on the circumferential face of the support shaft comprises plastic reshaping of the circumferential face of the support shaft to produce the at least one structure thereon.

* * * * *